US009080031B2

(12) United States Patent
Shigemitsu

(10) Patent No.: US 9,080,031 B2
(45) Date of Patent: Jul. 14, 2015

(54) GOLF BALL RESIN COMPOSITION AND GOLF BALL USING THE SAME

(75) Inventor: Takahiro Shigemitsu, Kobe (JP)

(73) Assignee: DUNLOP SPORTS CO. LTD., Kobe-shi (JP)

(*) Notice: Subject to any disclaimer, the term of this patent is extended or adjusted under 35 U.S.C. 154(b) by 599 days.

(21) Appl. No.: 12/881,761

(22) Filed: Sep. 14, 2010

(65) Prior Publication Data

US 2011/0092312 A1    Apr. 21, 2011

(30) Foreign Application Priority Data

Oct. 16, 2009   (JP) ................................. 2009-239149
Apr. 27, 2010   (JP) ................................. 2010-102535

(51) Int. Cl.
| | |
|---|---|
| A63B 37/00 | (2006.01) |
| C08K 5/098 | (2006.01) |
| C08K 5/14 | (2006.01) |
| C08K 5/375 | (2006.01) |

(52) U.S. Cl.
CPC ............. *C08K 5/098* (2013.01); *A63B 37/0003* (2013.01); *A63B 37/0039* (2013.01); *A63B 37/0045* (2013.01); *A63B 37/0048* (2013.01); *A63B 37/0062* (2013.01); *A63B 37/0065* (2013.01); *A63B 37/0075* (2013.01); *C08K 5/14* (2013.01); *C08K 5/375* (2013.01)

(58) Field of Classification Search
None
See application file for complete search history.

(56) References Cited

U.S. PATENT DOCUMENTS

| | | | | |
|---|---|---|---|---|
| 3,264,272 | A | * | 8/1966 | Watkin .......................... 428/36.9 |
| 5,298,571 | A | * | 3/1994 | Statz et al. .................. 525/330.2 |
| 5,306,760 | A | | 4/1994 | Sullivan |
| 5,312,857 | A | | 5/1994 | Sullivan |
| 6,100,321 | A | | 8/2000 | Chen |
| 6,329,458 | B1 | | 12/2001 | Takesue et al. |
| 6,653,382 | B1 | * | 11/2003 | Statz et al. ..................... 524/400 |
| 6,962,951 | B1 | | 11/2005 | Takesue et al. |
| 2001/0019971 | A1 | * | 9/2001 | Hayashi et al. ............... 473/371 |
| 2003/0190976 | A1 | * | 10/2003 | Binette et al. ................. 473/354 |
| 2005/0037216 | A1 | * | 2/2005 | Chen et al. .................. 428/476.3 |
| 2005/0049084 | A1 | * | 3/2005 | Iwami et al. .................. 473/383 |
| 2005/0256269 | A1 | | 11/2005 | Takesue et al. |
| 2006/0128504 | A1 | * | 6/2006 | Watanabe et al. ............. 473/371 |
| 2009/0209368 | A1 | * | 8/2009 | Kasashima et al. ........... 473/374 |
| 2010/0160515 | A1 | * | 6/2010 | Iizuka et al. .................. 524/322 |
| 2010/0234137 | A1 | * | 9/2010 | Higuchi et al. ............... 473/373 |

FOREIGN PATENT DOCUMENTS

| | | | |
|---|---|---|---|
| JP | 2000-93557 | A | 4/2000 |
| JP | 2000-157646 | A | 6/2000 |
| JP | 2001-120686 | A | 5/2001 |
| JP | 2002-514112 | A | 5/2002 |

OTHER PUBLICATIONS

English translation of Japanese Office Action, dated Dec. 6, 2011, for Application No. 2010-102535.
English Translation of Japanese Office Action dated Jun. 19, 2012 for Application No. 2010-102535.

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball resin composition that comprises an ionomer resin with an excellent resilience and fluidity. Another object of the present invention is to provide a golf ball excellent in the resilience without lowering the durability significantly in a golf ball using the ionomer resin for the intermediate layer. The present invention provides a golf ball resin composition comprising, 100 parts by mass of (A) an ionomer resin consisting of a metal ion-neutralized product of a ternary copolymer composed of ethylene, $\alpha,\beta$-unsaturated carboxylic acid having 3 to 8 carbon atoms and $\alpha,\beta$-unsaturated carboxylic acid ester, and from 25 parts to 100 parts by mass of (B) a metal salt of a fatty acid having 18 to 30 carbon atoms. The golf ball of the present invention is not limited, as long as it comprises a constituent member formed from the golf ball resin composition of the present invention.

17 Claims, 1 Drawing Sheet

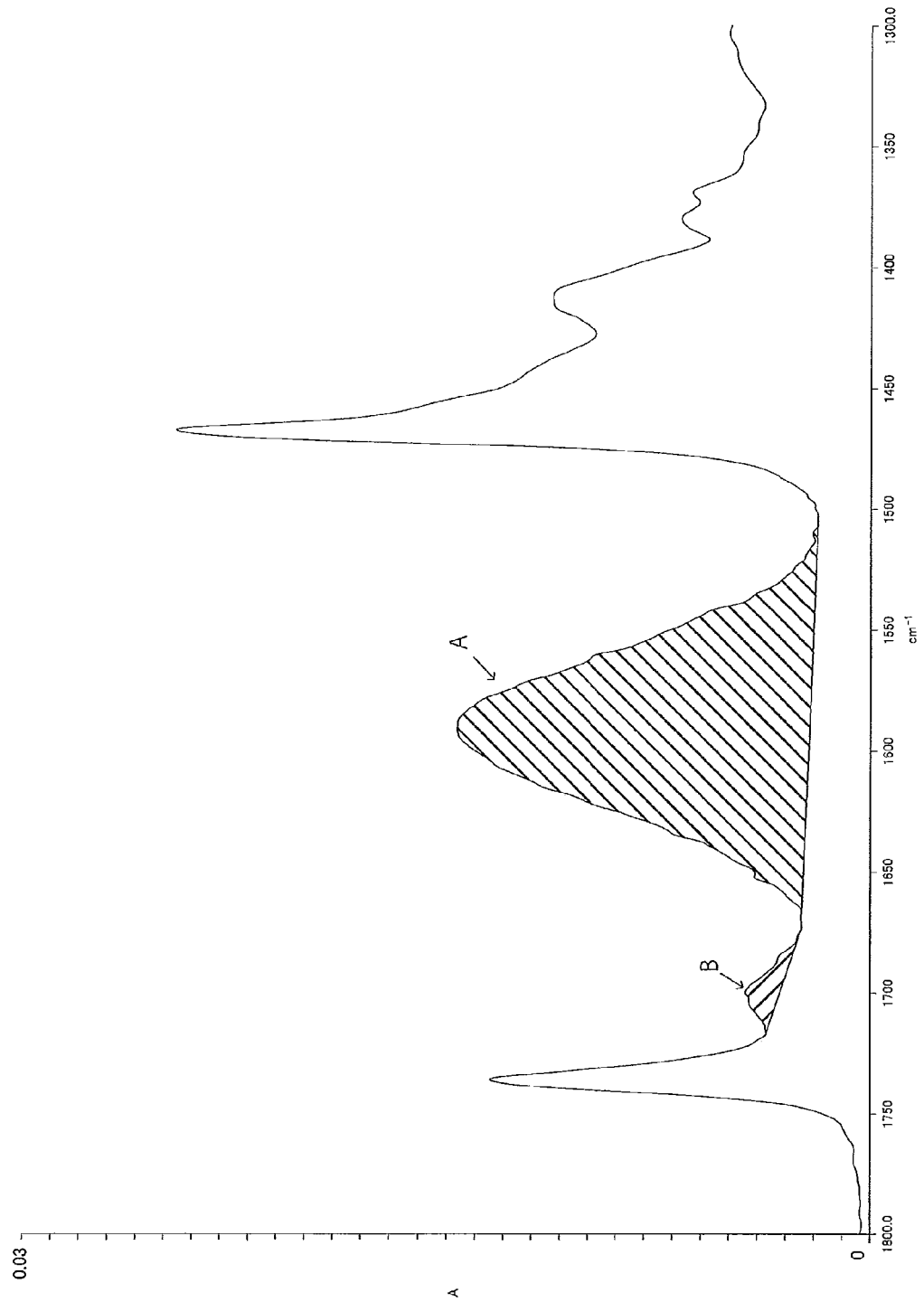

GOLF BALL RESIN COMPOSITION AND
GOLF BALL USING THE SAME

FIELD OF THE INVENTION

The present invention relates to a golf ball resin composition and a golf ball using the same, in particular, an ionomer resin composition for a golf ball and a golf ball using the same.

DESCRIPTION OF THE RELATED ART

Ionomer resins and polyurethane are used as materials for constituting golf balls. Use of the ionomer resins as the constituting material of the golf ball provides the golf ball traveling a great distance, because of its high stiffness. Accordingly, ionomer resins are widely used as a material constituting a cover or an intermediate layer of the golf ball. However, there still remains a room for further improvement with respect to the stiffness and fluidity thereof and various improvements have been proposed for improving these properties.

Japanese Patent Publication No. 2000-157646 A discloses a golf ball cover composition having a melt index (MI) of 1 dg/sec. or more and primarily comprising a mixture of a base resin, blended with (d) a metal soap obtained by neutralizing an organic acid having up to 29 carbon atoms with a monovalent to trivalent metal ion, in a mass ratio of the base resin to the metal soap being 95:5 to 80:20, wherein the base resin comprises an ionomer resin component containing (a) a ternary ionomer resin consisting of a metal ion neutralized product of an olefin-unsaturated carboxylic acid-unsaturated carboxylate copolymer having an acid content of 12 wt % or less, and (b) a binary ionomer resin consisting of a metal ion neutralized product of an olefin-unsaturated carboxylic acid copolymer having an acid content of 15 wt % or less in a ratio of 40:60 to 100:0; and (c) an unneutralized random copolymer composed of olefin and unsaturated carboxylic acid monomers, in a mass ratio of the ionomer resin component to (c) the unneutralized random copolymer being 75:25 to 100:0

JP2002-514112 T discloses a golf ball having a core and a cover, or a wound center and a cover, the core or center comprising; (i) an ionomeric polymer containing a) ethylene, b) from 5 to 25 weight percent (meth)acrylic acid, c) from 0 to 40 weight percent of a 1 to 8C-alkyl, alkyl acrylate, the acid groups neutralized to between 10 and 90 percent with zinc, sodium, lithium, calcium, magnesium ions and a mixture of any of these, and (ii) from 5 to 45 weight percent, based on (i) plus (ii), of a metal stearate, the metal selected from the group consisting of calcium, sodium, zinc, lithium, magnesium and barium or a mixture of said metal stearates.

U.S. Pat. No. 5,306,760 discloses a golf ball comprising a core and a cover, wherein the cover consists essentially of 100 parts by weight of at least one ionomer resin and from about 25 to about 100 parts by weight of fatty acid salt, wherein said ionomer resin is the reaction product of an olefin having from 2 to 8 carbon atoms and an unsaturated monocarboxylic acid having from 3 to 8 carbon atoms.

U.S. Pat. No. 5,312,857 discloses a golf ball comprising a core and a cover, wherein the cover consists essentially of 100 parts by weight of at least one ionomer resin and from about 25 to about 100 parts by weight of a metal stearate, wherein said ionomer resin is the reaction product of an olefin having from 2 to 8 carbon atoms and an unsaturated monocarboxylic acid having from 3 to 8 carbon atoms.

SUMMARY OF THE INVENTION

In order to improve the resilience of the golf ball, from an aspect of the golf ball construction, there is an approach of making the thin-walled cover or intermediate layer. From an aspect of the material, the ionomer resin having a high degree of neutralization is employed. However, since the ionomer resin having a high degree of neutralization has low fluidity, it is difficult to make a thin-walled cover or intermediate layer. As a technology of improving the fluidity of the ionomer resin, it is known that a metal salt of a fatty acid is added to the ionomer resin having a high degree of neutralization. However, if the added amount is less than the certain level, the effect of improving the resilience of the obtained golf ball is low, while if the added amount is more than the certain level, the durability of the obtained golf ball is lowered, because mechanical properties of the material are lowered.

The present invention has been achieved in view of the above circumstances. An object of the present invention is to provide a golf ball resin composition that comprises an ionomer resin with an excellent resilience and fluidity. Another object of the present invention is to provide a golf ball excellent in the resilience without lowering the durability significantly in a golf ball using the ionomer resin for the intermediate layer.

The present invention, which has solved the above problems, provides a golf ball resin composition comprising, 100 parts by mass of (A) an ionomer resin consisting of a metal ion-neutralized product of a ternary copolymer composed of ethylene, $\alpha,\beta$-unsaturated carboxylic acid having 3 to 8 carbon atoms and $\alpha,\beta$-unsaturated carboxylic acid ester (hereinafter, sometimes may be abbreviated to "(A) ternary ionomer resin"), and from 25 parts to 100 parts by mass of (B) a metal salt of a fatty acid having 18 to 30 carbon atoms (hereinafter, sometimes may be abbreviated to "(B) fatty acid metal salt"). The gist of the present invention resides in that the neutralization degree of (A) the ternary ionomer resin is increased by adding (B) the fatty acid metal salt into the (A) the ternary ionomer resin to neutralize the ionomer resin with a part of the metal salt of the fatty acid, while taking an advantage of the lubricating action of the metal salt of the fatty acid. Since the present invention is configured described above, the golf ball resin composition that comprises the ionomer resin with an excellent resilience and fluidity is obtained.

The present invention includes the golf ball resin composition before (A) the ternary ionomer resin is neutralized with (B) the fatty acid metal salt, and the golf ball resin composition after (A) the ternary ionomer resin is neutralized with (B) the fatty acid metal salt. The golf ball resin composition after neutralization may include the resin composition where (A) the ternary ionomer resin is partially neutralized with (B) the fatty acid metal salt. In the present invention, the golf ball resin composition before neutralization with (B) the fatty acid metal salt may be referred to as "non-neutralized golf ball resin composition," and the golf ball resin composition after neutralization with (B) the fatty acid metal salt may be referred to as "neutralized golf ball resin composition," respectively, but simply referred to as "golf ball resin composition" includes both embodiments, unless otherwise described.

According to the present invention, the golf ball resin composition that comprises an ionomer resin with an excellent resilience and fluidity is obtained. If the golf ball resin composition of the present invention is used for an intermediate layer, the golf ball excellent in resilience is obtained without lowering the durability significantly.

BRIEF DESCRIPTION OF THE DRAWINGS

FIG. 1 is a FT-IR spectrum of one embodiment of the golf ball resin composition of the present invention.

DESCRIPTION OF THE PREFERRED EMBODIMENT

The present invention provides a golf ball resin composition comprising 100 parts by mass of (A) an ionomer resin consisting of a metal ion-neutralized product of a ternary copolymer composed of ethylene, α,β-unsaturated carboxylic acid having 3 to 8 carbon atoms and α,β-unsaturated carboxylic acid ester, and from 25 parts to 100 parts by mass of (B) a metal salt of a fatty acid having 18 to 30 carbon atoms.

First, (A) the ternary ionomer resin used in the present invention will be explained. The ionomer resin includes, for example, one prepared by neutralizing at least a part of carboxyl groups in a ternary copolymer composed of ethylene, α,β-unsaturated carboxylic acid having 3 to 8 carbon atoms, and α,β-unsaturated carboxylic acid ester with a metal ion. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among them, as (A) the ternary ionomer resin, preferred is the metal ion-neutralized product of the ternary copolymer composed of ethylene-(meth)acrylic acid-(meth)acrylic acid ester. Herein, "(meth)acrylic acid" means acrylic acid and/or methacrylic acid.

The content of α,β-unsaturated carboxylic acid having 3 to 8 carbon atoms in (A) the ternary ionomer resin is preferably 2 mass % or more, more preferably 3 mass % or more, and is preferably 30 mass % or less, more preferably 25 mass % or less.

If (A) the ternary ionomer resin is analyzed with FT-IR (Fourier transform infrared spectrophotometer), an area A0 under a peak around 1600 cm$^{-1}$ and an area B0 under a peak around 1700 cm$^{-1}$ in the obtained spectrum preferably satisfy the following equation: $0.30 \leq P0 = A0/(A0+B0) \leq 0.98$.

In the equation, A0 corresponds to an area under the peak attributed to the neutralized carboxyl group, and B0 corresponds to an area under the peak attributed to the non-neutralized carboxyl group. P0 is defined as a ratio of the neutralized carboxyl groups to the whole carboxyl groups and indicates a degree of neutralization of (A) the ternary ionomer resin. P0 is preferably 0.50 or more, and is preferably 0.97 or less. If P0 is not less than the lower limit of the above range, the resilience and the durability of the obtained constituting member becomes better, while if P0 is not more than the upper limit of the above range, the fluidity of the golf ball resin composition of the present invention becomes better (better moldability).

Specific examples of the ternary ionomer resin include trade name "Himilan (registered trademark) (e.g. Himilan AM7327 (Zn), Himilan 1855 (Zn), Himilan 1856 (Na), Himilan AM7331 (Na), or the like)" commercially available from Du Pont-Mitsui Polychemicals Co., Ltd. Further, the ternary ionomer resins commercially available from E.I. du Pont de Nemours and Company include trade name "Surlyn (registered trademark) (e.g. Surlyn 6320 (Mg), Surlyn 8120 (Na), Surlyn 8320 (Na), Surlyn 9320 (Zn), Surlyn 9320W (Zn) or the like)". Further, ionomer resins commercially available from ExxonMobil Chemical Corporation include trade name "Iotek (registered trademark) (e.g. Iotek 7510 (Zn), Iotek 7520 (Zn) or the like)". It is noted that Na, Zn, Li, and Mg described in the parentheses after the trade names indicate metal types of neutralizing metal ions.

Next, (B) the metal salt of the fatty acid having 18 to 30 carbon atoms will be explained. The fatty acid component of (B) the fatty acid metal salt preferably includes fatty acids having 18 to 30 carbon atoms, more preferably fatty acids having 18 to 28 carbon atoms.

Specific examples of the fatty acid include stearic acid (C18), oleic acid (C18), linoleic acid (C18), linolenic acid (C18), 12-hydroxy stearic acid (C18), arachidic acid (C20: icosanoic acid), arachidonic acid (C20), behenic acid (C22), lignoceric acid (C24), nervonic acid (C24), cerotic acid (C26), montanic acid (C28), and melissic acid (C30). The above fatty acid components may be used solely or as a mixture of at least two of them. Among them, stearic acid, behenic acid or montanic acid is preferable as the fatty acid component.

Examples of metal components of (B) the fatty acid metal salt include: monovalent metal ions such as sodium, potassium, lithium, or the like; divalent metal ions such as magnesium, calcium, zinc, barium, cadmium, or the like; trivalent metal ions such as aluminum or the like; and other metal ions such as tin, zirconium, or the like. These metal components may be used solely or as a mixture of at least two of them. Among these metal components, preferred are the divalent metals such as magnesium, calcium, barium, or the like.

Specific examples of (B) the fatty acid metal salts are magnesium stearate, calcium stearate, barium stearate, magnesium behenate, calcium behenate, barium behenate, magnesium montanate, calcium montanate, or barium montanate. (B) The fatty acid metal salts may be used solely or as a mixture of at least two of them.

The golf ball resin composition of the present invention preferably contains (B) the fatty acid metal salt in an amount of 25 parts or more, more preferably 33 parts or more, even more preferably 50 parts or more, and preferably contains (B) the fatty acid metal salt in an amount of 100 parts or less, more preferably 98 parts or less, even more preferably 95 parts or less, even more preferably 90 parts or less, with respect to 100 parts of (A) the ternary ionomer resin by mass. If the content of (B) the fatty acid metal salt is 25 parts by mass or more, the resilience of the golf ball improves, while if the content is 100 parts by mass or less, it is possible to suppress the lowering of the durability of the golf ball due to the increase in the low molecular weight component.

If the golf ball resin composition of the present invention, which is obtained by neutralizing (A) the ternary ionomer resin with (B) the fatty acid metal salt, is analyzed with FT-IR (Fourier transform infrared spectrophotometer), an area A under a peak around 1600 cm$^{-1}$ and an area B under a peak around 1700 cm$^{-1}$ in the obtained spectrum preferably satisfy the following equation: $0.50 \leq A/(A+B) \leq 1.00$.

In the equation, A corresponds to an area under the peak attributed to the neutralized carboxyl group, and B corresponds to an area under the peak attributed to the non-neutralized carboxyl group. P is defined as a ratio of the neutralized carboxyl groups to the whole carboxyl groups and indicates a degree of neutralization of the resin component. P is preferably 0.75 or more, more preferably 0.90 or more. If P falls within the above range, the resilience of the obtained golf ball becomes better.

The golf ball resin composition of the present invention preferably contains, as a resin component, (A) the ternary ionomer resin and (B) the fatty acid metal salt only, but may further contain another thermoplastic elastomer to the extent that the effect of the present invention is not deteriorated. In the case of containing another thermoplastic elastomer, the total content of (A) the ternary ionomer resin and (B) the fatty acid metal salt in the resin component is preferably 50 mass % or more, more preferably 60 mass % or more, even more preferably 70 mass % or more.

Examples of other thermoplastic elastomers are a thermoplastic polyamide elastomer having a commercial name of "Pebax (registered trademark) (e.g. "Pebax 2533")" commercially available from Arkema K. K.; a polyurethane elastomer having a commercial name of "Elastollan (registered trademark) (e.g. "Elastollan XNY85A")" commercially available from BASF Japan Ltd; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation.

In the present invention, the golf ball resin composition may further contain a pigment component such as a white pigment (for example, titanium oxide), a blue pigment (for example, ultramarine blue), a red pigment, or the like; a specific gravity adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the effect of the present invention.

The golf ball resin composition of the present invention can be obtained, for example, by dry blending (A) the ternary ionomer resin and (B) the fatty acid metal salt, followed by extruding them in the form of pellet. The dry blending may be carried out using for example, a mixer capable of blending a raw material in the form of pellet, more preferably a tumbler type mixer. In addition to the dry blending, the materials may be supplied respectively by the respective feeding machines. Extruding can be carried out by publicly known extruders such as a single-screw kneading extruder, a twin-screw kneading extruder, and a twin-single kneading extruder. The extruding condition is not particularly limited. For example, in the case of extruding with a twin-screw kneading extruder, the preferable conditions are screw diameter=45 mm; screw revolutions=50 rpm to 400 rpm; screw L/D=35 or less, and die temperature; 140° C. to 250° C.

The golf ball of the present invention is not limited, as long as it comprises a constituent member formed from the golf ball resin composition of the present invention. For example, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least one intermediate layer disposed around the center, and a cover disposed around the core (including the three-piece golf ball mentioned above), anyone of constituent members is formed from the above golf ball resin composition. In one preferable embodiment, the intermediate layer is formed from the above golf ball resin composition.

In the followings, the present invention will be explained based on the preferable golf ball that comprises a core having a center and at least one intermediate layer disposed around the center and a cover disposed around the core, wherein the intermediate layer is formed from the above golf ball resin composition. However, the present invention is not limited to this embodiment.

The core of the golf ball of the present invention preferably includes, for example, a multi-layered core having a center and at least one intermediate layer covering the center. The core preferably has a spherical shape. If the core does not have a spherical shape, the cover does not have a uniform thickness. As a result, there exist some portions where the performance of the cover is lowered.

On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center. The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

A conventionally known rubber composition (hereinafter, sometimes simply referred to as "center rubber composition") may be employed for the center of the golf ball of the present invention, and it can be molded by, for example, heat-pressing a rubber composition containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior resilience property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.3 part by mass or more, more preferably 0.4 part by mass or more, and is preferably 5 parts by mass or less, more preferably 3 parts by mass or less based on 100 parts by mass of the base rubber. If the amount is less than 0.3 part by mass, the center becomes too soft, and the resilience tends to be lowered, and if the amount is more than 5 parts by mass, the amount of the co-crosslinking agent must be increased in order to obtain the appropriate hardness, which tends to cause the insufficient resilience.

The co-crosslinking agent is not particularly limited as long as it serves to crosslink a rubber molecule by graft polymerization to a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 15 parts or more, even more preferably 20 parts or more, and is preferably 55 parts or less, more preferably 50 parts or less, even more preferably 48 parts or less, based on 100 parts of the base rubber by mass. If the amount of the co-crosslinking agent to be used is less than 10 parts by mass, the amount of the crosslinking initiator must be increased to obtain an appropriate hardness, which tends to lower the resilience. On the other hand, if the amount of the co-crosslinking agent to be used is more than 55 parts by mass, the center becomes too hard, so that the shot feeling may be lowered.

The filler contained in the center rubber composition is mainly blended as a specific gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part or more, more preferably 1 part or more, and is preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the resilience tends to be lowered.

As the center rubber composition, an organic sulfur compound, an antioxidant or a peptizing agent may be blended appropriately in addition to the base rubber, the crosslinking initiator, the co-crosslinking agent and the filler.

As the organic sulfur compound, diphenyl disulfide or a derivative thereof may be preferably used. Examples of the diphenyl disulfide or the derivative thereof include diphenyl disulfide; mono-substituted diphenyl disulfide such as bis (4-chlorophenyl) disulfide, bis (3-chlorophenyl) disulfide, bis (4-bromophenyl) disulfide, bis (3-bromophenyl) disulfide, bis (4-fluorophenyl) disulfide, bis (4-iodophenyl)disulfide and bis (4-cyanophenyl) disulfide; di-substituted diphenyl disulfide such as bis (2,5-dichlorophenyl) disulfide, bis (3,5-dichlorophenyl) disulfide, bis (2,6-dichlorophenyl) disulfide, bis (2,5-dibromophenyl) disulfide, bis (3,5-dibromophenyl) disulfide, bis (2-chloro-5-bromophenyl) disulfide, and bis (2-cyano-5-bromophenyl) disulfide; tri-substituted diphenyl disulfide such as bis (2,4,6-trichlorophenyl) disulfide, and bis (2-cyano-4-chloro-6-bromophenyl) disulfide; tetra-substituted diphenyl disulfide such as bis (2,3,5,6-tetrachlorophenyl) disulfide; penta-substituted diphenyl disulfide such as bis (2,3,4,5,6-pentachlorophenyl)disulfide and bis (2,3,4,5,6-pentabromophenyl)disulfide. These diphenyl disulfides or the derivative thereof can enhance resilience by having some influence on the state of vulcanization of vulcanized rubber. Among them, diphenyl disulfide or bis (pentabromophenyl) disulfide is preferably used since the golf ball having particularly high resilience can be obtained. The amount of the diphenyl disulfide or the derivative thereof to be blended is preferably 0.1 part by mass or more, more preferably 0.3 part by mass or more, and is preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The center can be obtained by mixing, kneading the above mentioned rubber composition and molding the rubber composition in the mold. The conditions for press-molding the center rubber composition should be determined depending on the rubber composition. Specifically, the press-molding is preferably carried out for 10 to 60 minutes at the temperature of 130° C. to 200° C. under the pressure from 2.9 MPa to 11.8 MPa. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

The diameter of the center is preferably 34.8 mm or more, more preferably 35.0 mm or more, and even more preferably 35.2 mm or more, and is preferably 41.2 mm or less, more preferably 41.0 mm or less, and even more preferably 40.8 mm or less. If the diameter of the center is 34.8 mm or more, the intermediate layer or the cover layer does not become excessively thick, and hence the resilience of the golf ball becomes good. On the other hand, if the diameter of the center is 41.2 mm or less, the intermediate layer or the cover does not become excessively thin, and hence the intermediate layer or the cover functions better.

When the center has a diameter from 34.8 mm to 41.2 mm, a compression deformation amount (shrinking deformation amount of the center along the compression direction) of the center when applying a load from 98 N as an initial load to 1275 N as a final load is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is 1.90 mm or more, the shot feeling becomes good, while if the compression deformation amount is 4.00 mm or less, the resilience becomes better.

The surface hardness of the center is preferably 45 or larger, more preferably 50 or larger, and even more preferably 55 or larger, and is preferably 65 or smaller, more preferably 62 or smaller, and even more preferably 60 or smaller in shore D hardness. If the surface hardness is 45 or more in Shore D hardness, the center does not become excessively soft and the resilience becomes good. If the surface hardness of the center is 65 or less in Shore D hardness, the center does not become so hard and the shot feeling becomes good.

In one preferable embodiment, the intermediate layer is, for example, formed by covering the center with the golf ball resin composition (hereinafter, sometimes merely referred to as "intermediate layer composition"). An embodiment for molding the intermediate layer is not particularly limited, and includes an embodiment which comprises injection molding the intermediate layer composition directly onto the center, or an embodiment which comprises molding the intermediate layer composition into a half hollow-shell, covering the center with the two half hollow-shells, and subjecting the center with the two half hollow-shells to the compression-molding at the temperature of 130° C. to 170° C. for 1 min to 5 mins.

In the case of directly injection molding the intermediate layer composition onto the center, it is preferred to use upper and lower molds for forming the intermediate layer having a spherical cavity and pimples, wherein a part of the pimple also serves as a retractable hold pin. When forming the intermediate layer by injection molding, the hold pin is protruded to hold the center, and the intermediate layer composition which has been heated and melted is charged and then cooled to obtain the intermediate layer. For example, the intermediate layer composition heated and melted at the temperature of 150° C. to 230° C. is charged into a mold held under the pressure of 980 KPa to 1,500 KPa for 0.1 to 1 second. After cooling for 15 to 60 seconds, the mold is opened.

When molding the intermediate layer in a compression molding method, molding of the half shell can be performed by either compression molding method or injection molding method, and the compression molding method is preferred. The compression-molding of the intermediate layer composition into half shell can be carried out, for example, under a pressure of 1 MPa or more and 20 MPa or less at a temperature of −20° C. or more and 70° C. or less relative to the flow beginning temperature of the intermediate layer composition. By performing the molding under the above conditions, a half shell having a uniform thickness can be formed. Examples of a method for molding the intermediate layer using half shells include compression molding by covering the center with two half shells. The compression molding of half shells into the intermediate layer can be carried out, for example, under a pressure of 0.5 MPa or more and 25 MPa or less at a temperature of −20° C. or more and 70° C. or less relative to the flow beginning temperature of the intermediate layer composition. By performing the molding under the above conditions, the intermediate layer having a uniform thickness can be formed.

The molding temperature means the highest temperature where the temperature at the surface of the concave portion of the lower mold reaches from closing through opening the molds. Further, the flow beginning temperature of the golf ball forming resin composition can be measured in a pellet form under the following conditions by using a flow characteristics evaluation apparatus (Flow Tester CFT-500, manufactured by Shimadzu Corporation).
Measuring conditions: Area size of a plunger: 1 $cm^2$, Die length: 1 mm, Die diameter: 1 mm, Load: 588.399 N, Start temperature: 30° C., and Temperature increase rate: 3° C./min.

The thickness of the intermediate layer is preferably less than 2.5 mm, more preferably 1.8 mm or less, and even more preferably 1.6 mm or less, even more preferably 1.2 mm or less. If the thickness of the intermediate layer is less than 2.5 mm, the resilience and shot feeling of the golf ball is improved. The thickness of the intermediate layer is preferably 0.1 mm or more, more preferably 0.3 mm or more, even more preferably 0.5 mm or more, even more preferably more than 0.7 mm. If the thickness of the intermediate layer is 0.1 mm or more, it is easier to mold the intermediate layer. Further, the durability of the resultant golf ball is enhanced.

In the case that the golf ball resin composition of the present invention is used as the intermediate layer composition, the melt flow rate (190° C., 2.16 kg) of the intermediate layer composition is preferably 0.1 g/10 min or more, more preferably 1.0 g/10 min or more, and even more preferably 3.0 g/10 min or more, even more preferably 3.5 g/10 min or more, and is preferably 600 g/10 min or less, more preferably 300 g/10 min or less, even more preferably 100 g/10 min or less, and even more preferably 35 g/10 min or less. If the melt flow rate of the intermediate layer composition is 0.1 g/10 min or more, the moldability is enhanced and thus it is easy to mold the thin-walled intermediate layer.

In the case that the golf ball resin composition of the present invention is used as the intermediate layer composition, the intermediate layer composition preferably has a bending stiffness of 100 MPa or more, more preferably 110 MPa or more, even more preferably 120 MPa or more, and preferably has a bending stiffness of 450 MPa or less, more preferably 420 MPa or less, even more preferably 400 MPa or less. If the bending stiffness of the intermediate layer composition is 100 MPa or more, since the obtained golf ball has an outer-hard inner soft structure, the flight distance becomes great. On the other hand, if the bending stiffness is 450 MPa or less, the obtained golf ball becomes appropriately soft and thus the shot feeling becomes good.

In the case that the golf ball resin composition of the present invention is used as the intermediate layer composition, the intermediate layer composition preferably has a rebound resilience of 40% or more, more preferably 41% or more, even more preferably 42% or more. If the intermediate layer composition has a rebound resilience of 40% or more, the flight distance of the obtained golf ball becomes great. The rebound resilience is preferably, but not limited to, 80% or less, more preferably 78% or less. Herein, the bending stiffness and the rebound resilience of the intermediate layer composition are measured by molding the intermediate layer composition into a sheet form. The method for the measurement is described later.

The intermediate layer composition preferably has a slab hardness of 20 or more, more preferably 25 or more, even more preferably 30 or more, even more preferably 40 or more, and preferably has a slab hardness of 70 or less, more preferably 65 or less, even more preferably 60 or less in Shore D hardness. If the intermediate layer composition has a slab hardness of 20 or more, the stiffness of the resultant intermediate layer is enhanced, and thus the golf ball excellent in the resilience (flight distance) is obtained. On the other hand, if the intermediate layer composition has a slab hardness of 70 or less, the durability of the resultant golf ball is further enhanced. Herein, the slab hardness of the intermediate layer composition is a measured hardness of the intermediate layer composition that is molded into a sheet form by a measuring method described later.

The melt flow rate, bending stiffness, rebound resilience and the slab hardness of the intermediate layer composition can be adjusted by appropriately selecting kinds, amount or the like of (A) the ternary ionomer resin and (B) the metal salt of the fatty acid.

In one preferable embodiment that the golf ball of the present invention has at least two intermediate layers, the golf ball may have an intermediate layer which is formed from an intermediate layer composition different from the golf ball resin composition of the present invention, as long as at least one of the intermediate layer is formed from the golf ball resin composition of the present invention. In this case, it is preferred that the outermost layer of the core is an intermediate layer formed from the golf ball resin composition of the present invention, and it is more preferred that all the multi-piece of intermediate layers or multi-layer of intermediate layers are formed from the golf ball resin composition of the present invention.

Examples of the intermediate layer composition which is different from the golf ball resin composition of the present invention include, a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" commercially available from BASF Japan Ltd., a thermoplastic polystyrene elastomer having a trade name "Rabalon (registered trademark)" commercially available from Mitsubishi Chemical Corporation, and the like, in addition to the center rubber composition described above and the ionomer resin. Further, the intermediate layer composition may contain a specific gravity adjusting agent such as barium sulfate, tungsten, or the like; an antioxidant; a pigment; or the like.

In one preferable embodiment, the diameter of the core of the golf ball is preferably 39.0 mm or more, more preferably 39.5 mm or more, and even more preferably 40.8 mm or more. If the diameter of the core is less than 39.0 mm, the cover becomes excessively thick and hence the resilience of the golf ball may deteriorate. Further, the diameter of the core is preferably 42.2 mm or less, more preferably 42.0 mm or less, and even more preferably 41.8 mm or less. If the diameter of the core is more than 42.2 mm, the thickness of the cover becomes relatively thin, and hence a protection effect of the cover is not obtained sufficiently.

When the core has a diameter from 39.0 mm to 42.2 mm, a compression deformation amount (shrinking deformation amount of the core along the compression direction) of the core when applying a load from 98 N as an initial load to 1275 N as a final load is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is less than 1.90 mm, the core becomes too hard, resulting in the poor shot feeling, while if the compression deformation amount is more than 4.00 mm, the core becomes too soft, resulting in the heavy shot feeling.

The center hardness of the core is preferably 30 or larger, more preferably 32 or larger, and even more preferably 35 or larger in Shore D hardness. If the center hardness is smaller than 30 in Shore D hardness, the core becomes so soft that the resilience of the golf ball tends to become lower. The center hardness of the core is preferably 50 or smaller, more preferably 48 or smaller, and even more preferably 45 or smaller in Shore D hardness. If the center hardness is more than 50 in Shore D hardness, the core becomes too hard, resulting in the poor shot feeling. In the present invention, the center hardness of the core is the hardness measured with the Shore D type spring hardness tester at the central point of a cut plane of a core which has been cut into two halves.

The surface hardness of the core is preferably 20 or larger, more preferably 25 or larger, and even more preferably 30 or larger in Shore D hardness. If the surface hardness is less than 20 in Shore D hardness, the core becomes so soft and the resilience may be lowered. The surface hardness of the core is preferably 70 or smaller, more preferably 69 or smaller, and even more preferably 68 or smaller in shore D hardness. If the surface hardness is more than 70 in Shore D hardness, the core becomes so hard and the shot feeling may be lowered.

In one preferable embodiment, depending upon the objects, the core having the surface hardness larger than the center hardness, or the core having the center hardness larger than the surface hardness may be used as the core. For example, the surface hardness of the core is easily made larger than or smaller than the center hardness of the core by employing a multi-layered core structure.

In the case of using the relatively hard material for the cover covering the core (for example, the cover composition has a slab hardness of 50 or more in Shore D hardness), the shot feeling is improved by lowering the hardness of the intermediate layer. In the case of using the relatively soft material for the cover covering the core (for example, the cover composition has a slab hardness of less than 50 in Shore D hardness), the high launch angle and low spin rate on the driver shot or the like are achieved by increasing the hardness of the intermediate layer. As a result, the flight distance is improved.

In the case that the core has the surface hardness smaller than the center hardness, the hardness difference (center hardness–surface hardness) between the surface hardness and the center hardness of the core in the golf ball of the present invention is preferably 4 or larger, more preferably 7 or larger in Shore D hardness. If the surface hardness is smaller than the center hardness, the shot feeling of the golf ball is improved. Further, in this case, the hardness difference (center hardness–surface hardness) between the surface hardness and the center hardness of the core in the golf ball of the present invention is preferably 40 or less, more preferably 35 or less. If the hardness difference is too large, the durability of the golf ball may deteriorate.

In the case that the core has the surface hardness larger than the center hardness, the hardness difference (surface hardness–center hardness) between the surface hardness and the center hardness of the core in the golf ball of the present invention is preferably 4 or larger, more preferably 7 or larger in Shore D hardness. If the surface hardness is larger than of the center hardness, the launch angle becomes high and the spin rate becomes low, thereby improving the flight distance. Further, in this case, the hardness difference (surface hardness–center hardness) between the surface hardness and the center hardness of the core in the golf ball of the present invention is preferably 40 or less, more preferably 35 or less. If the hardness difference is too large, the durability of the golf ball may deteriorate.

In one preferable embodiment, the cover of the golf ball of the present invention is formed from a cover composition containing a resin component. The resin component includes, for example, a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation, in addition to the polyurethane resin and the ionomer resin. These resin components are used solely or as a mixture of at least two of them.

In one preferable embodiment, the cover composition preferably contains the polyurethane resin or the ionomer resin, as the resin component. The content of the polyurethane resin or the ionomer resin in the resin component of the cover composition is preferably 50 mass % or more, more preferably 60 mass % or more, even more preferably 70 mass % or more. In more preferable embodiment, the cover composition contains the ionomer resin as the resin component. Since the ionomer resins are used for both of the cover and the intermediate layer, the adhesion between the intermediate layer and the cover will become much higher.

In the present invention, in addition to the aforementioned resin component, the cover composition may further contain a pigment component such as a white pigment (for example, titanium oxide), a blue pigment (for example, ultramarine blue), a red pigment, or the like; a specific gravity adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 parts by mass or more, it is possible to impart the opacity to the cover. If the amount of the white pigment is more than 10 parts by mass, the durability of the cover may deteriorate.

The cover composition preferably has a slab hardness of 70 or less, more preferably 68 or less, even more preferably 65 or less in Shore D hardness. If the cover composition has a slab hardness of 70 or less, the spin rate on the approach shots with short irons increases. As a result, the golf ball having a good controllability on the approach shots is obtained. In order to ensure the spin rate sufficiently for the approach shots, the cover composition preferably has a slab hardness of 20 or more, more preferably 25 or more, even more preferably 30 or more in Shore D hardness.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 200° C. to 250° C. is charged into a mold held under the pressure of 9 MPa to 15 MPa for 0.5 to 5 second. After cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

In the present invention, the thickness of the cover of the golf ball is preferably 2.0 mm or less, more preferably 1.6 mm or less, even more preferably 1.2 mm or less, even more preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the abrasion resistance of the cover may deteriorate.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 µm or larger, and more preferably 7 µm or larger, and preferably has a thickness of 25 µm or smaller, and more preferably 18 µm or smaller. If the thickness is smaller than 5 µm, the paint film is easy to wear off due to continued use of the golf ball, and if the thickness is larger than 25 µm, the effect of the dimples is reduced, resulting in deteriorating flying performance of the golf ball.

When the golf ball of the present invention has a diameter in a range from 40 mm to 45 mm, a compression deformation amount of the golf ball (an amount of compression of the golf ball in the compression direction thereof) when applying an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. If the compression deformation amount is 4.0 mm or less, the resilience is enhanced.

The present invention is explained based on the embodiment where the golf ball resin composition of the present invention is used for the intermediate layer, but the golf ball resin composition of the present invention may be used for the cover layer.

EXAMPLES

Hereinafter, the present invention will be described in detail by way of example. The present invention is not limited to examples described below. Various changes and modifications can be made without departing from the spirit and scope of the present invention.

(1) Hardness of Center and Core (Shore D Hardness)

A type P1 auto loading durometer manufactured by Kobunshi Keiki Co., Ltd., provided with a Shore D type spring hardness tester prescribed in ASTM-D2240 was used to measure the surface hardness and the center hardness of the center and the core. Shore D hardness measured at the surfaces of the center and the core are defined as the surface hardness of the center and the core, respectively. The core was cut into two hemispheres to obtain a cut plane, and a Shore D hardness measured at the center of the cut plane was used as the center hardness of the core.

(2) Slab Hardness (Shore D Hardness)

Sheets with a thickness of about 2 mm were produced by injection molding the cover composition and the intermediate layer composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(3) Compression Deformation Amount (mm) A compression deformation amount of the center, core and golf ball (a shrinking amount of the center, core, and golf ball in the compression direction thereof), when applying a load from 98 N as an initial load to 1275 N as a final load to the center, core and golf ball, was measured.

(4) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. and the load of 2.16 kg.

(5) Bending Stiffness (MPa)

A sheet with a thickness of about 2 mm was produced by a hot press molding from the intermediate layer composition, and stored at 23° C. for two weeks. The bending stiffness was measured according to JIS K7106. The measurement was conducted under the conditions of the temperature 23° C. and humidity 50 RH %.

(6) Rebound Resilience

A sheet with a thickness of about 2 mm was produced by a hot press molding from the intermediate layer composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50 RH %). Preparation of the test piece and the testing method are based on JIS K6255.

(7) Durability

A metal-head driver (W#1) was installed on a swing robot manufactured by TRUETEMPER CO, and the head speed was set to 45 m/sec. Each golf ball was stored in a constant temperature reservoir kept at the temperature of 23° C. for 12 hours. Immediately after taking each golf ball out of the reservoir, they were repeatedly hit with the driver. The number of hits required to break the golf ball was counted. This measurement was conducted twelve times for each golf ball. The number of hits for golf ball No. 14 was defined as an index of 100, and the durability of each golf ball was represented by converting the number of hits for each golf ball into this index. A greater index value indicates that the durability of the golf ball is excellent.

(8) Coefficient of Repulsion for Golf Balls

A 198.4 g of metal cylindrical object was forced to collide with each golf ball at a speed of 40 m/sec, and the speeds of the cylindrical object and the golf ball before and after the collision were measured. Based on these speeds and the mass of each object, coefficient of repulsion for each golf ball was calculated. The measurement was conducted by using twelve of each golf ball, and the average value was regarded as the coefficient of repulsion for the golf ball. The coefficient of repulsion of golf ball No. 14 was defined as an index of 100.0, and the coefficient of repulsion of each golf ball was represented by converting the coefficient of repulsion of each golf ball into this index.

(9) FT-IR Measurement

A measuring samples were taken from the intermediate layers that were injection-molded and analyzed with Fourier transform infrared spectrophotometer (Auto IMAGE FT-IR) available from PerkinElmer, Inc by a macro ATR method (germanium prism, observation diameter: about 1 mm). The area A under a peak around $1600\ cm^{-1}$ and the area B under a peak around $1700\ cm^{-1}$ were determined from the obtained spectrum. FIG. 1 shows a FT-IR spectrum of the intermediate layer of the golf ball No. 1 (vertical axis: absorbance). Base lines were drawn for Peak A around $1600\ cm^{-1}$ and Peak B around $1700\ cm^{-1}$, respectively, as shown FIG. 1 and area A, B were calculated. It is noted that Peak A around $1600\ cm^{-1}$ may shift depending on kinds of metal neutralizing the carboxyl group.

[Production of Golf Balls]

(1) Production of Center

The center rubber compositions having the formulations shown in Table 1 were kneaded and heat-pressed in upper and lower molds, each having a hemispherical cavity, at 170° C. for 15 minutes to prepare spherical centers. The amount of barium sulfate was adjusted appropriately to make a golf ball have a weight of 45.4 g.

TABLE 1

| | Center No. | A | B | C | D |
|---|---|---|---|---|---|
| Formulation | Polybutadiene | 100 | 100 | 100 | 100 |
| | Zinc acrylate | 25 | 25 | 25 | 25 |
| | Zinc oxide | 5 | 5 | 5 | 5 |
| | Diphenyl disulfide | 0.5 | 0.5 | 0.5 | 0.5 |
| | Dicumyl peroxide | 0.9 | 0.9 | 0.9 | 0.9 |
| | Barium sulfate | Appropriate Amount*) | Appropriate Amount*) | Appropriate Amount*) | Appropriate Amount*) |
| Properties | Diameter (mm) | 38.8 | 39.4 | 37.2 | 35.8 |
| | Center hardness (Shore D) | 40 | 40 | 40 | 40 |
| | Surface hardness (Shore D) | 49 | 49 | 49 | 49 |
| | Compression deformation amount (mm) | 4.0 | 4.0 | 4.0 | 4.0 |

Formulation: parts by mass
*)Depending on the cover composition, adjustment was made such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Diphenyl disulfide: manufactured by Sumitomo Seika Chemicals Co., Ltd.
Dicumyl peroxide: "Percumyl (registered trademark) D" manufactured by NOF Corporation.

(2) Preparation of Intermediate Layer Composition and Cover Composition

Blending materials shown in Tables 2 to 7 were mixed with a twin-screw kneading extruder to prepare the intermediate layer composition and cover compositions in the pellet form. The extruding conditions were a screw diameter of 45 mm, a screw rotational speed of 200 rpm, and screw L/D=35, and the mixtures were heated to 160 to 230° C. at the die position of the extruder.

TABLE 2

| Cover composition No. | | |
|---|---|---|
| Formulation (Parts) | Himilan 1555 | 48 |
| | Himilan AM7329 | 47 |
| | Rabalon T3221C | 5 |
| | Titanium oxide | 4 |
| Properties | Melt flow rate (g/10 min) | 8 |
| | Slab hardness (Shore D) | 59 |
| | Bending stiffness (MPa) | 224 |
| | Rebound resilience (%) | 53 |

Note on Table 2:
Himilan 1555: Sodium ion neutralized ethylene-methacrylic acid copolymer ionomer resin available from Du Pont-Mitsui Polychemicals Co., Ltd
Himilan AM7329: Zinc ion neutralized ethylene-methacrylic acid copolymer ionomer resin available from Du Pont-Mitsui Polychemicals Co., Ltd
Rabalon T3221C: Polystyrene elastomer available from Mitsubishi Chemical Corporation.

(3) Production of Golf Ball Body

The intermediate layer compositions obtained above were injection-molded onto the spherical centers to form the intermediate layers covering the centers and prepare spherical cores. Subsequently, golf balls were produced by injection-molding the cover composition onto the spherical cores to form the cover. Upper and lower molds for the intermediate layer and the cover have a spherical cavity with pimples, a part of which serves as a hold pin which is extendable and retractable.

When molding the intermediate layer, the hold pins were protruded to hold the center after the center was put in, the intermediate layer composition heated to 260° C. was charged into the mold under a pressure of 80 tons within 0.3 seconds, and cooled for 30 seconds. Then, the mold was opened, and the cores were taken out from the mold.

When molding the cover, the hold pins were protruded to hold the core after the core was put in, the cover composition heated to 210° C. was charged into the mold under a pressure of 80 tons within 0.3 seconds, and cooled for 30 seconds. Then, the mold was opened, and the golf ball bodies were taken out from the mold. The surface of the obtained golf ball bodies were treated with sandblast, marked, and painted with a clear paint. The paint was dried in an oven at 40° C. to form a paint film, and golf balls having a diameter of 42.8 mm and a mass of 45.4 g were obtained. The results of evaluations with respect to the compression deformation amount and resilience of the golf balls were also shown in tables 3 to 7.

TABLE 3

| | | | | Golf ball No. | | | | |
|---|---|---|---|---|---|---|---|---|
| | | | | 1 | 2 | 3 | 4 | 5 |
| Intermediate layer composition | | Center No. | | A | A | A | A | A |
| | Resin component | (A)Component | Surlyn 6320 (Mg) | — | — | — | 100 | — |
| | | | Himilan AM7327 (Zn) | 100 | 100 | 100 | — | 100 |
| | | | Surlyn 8320 (Na) | — | — | — | — | — |
| | | | Himilan AM7311 (Mg, binary copolymer) | — | — | — | — | — |
| | | (B)component | Mg stearate | 60 | 80 | — | — | — |
| | | | Ca stearate | — | — | — | — | — |
| | | | Mg Behenate | — | — | 33 | 60 | 70 |
| | | | Mg Montanate | — | — | — | — | — |
| | | | Titanium oxide | 4 | 4 | 4 | 4 | 4 |
| | Properties | | Melt flow rate (g/10 min) | 16.5 | 22.1 | 7.1 | 14.7 | 18.0 |
| | | | Slab hardness (Shore D) | 52 | 52 | 51 | 53 | 54 |
| | | | Bending stiffness (MPa) | 144 | 163 | 117 | 158 | 171 |
| | | | Rebound resilience (%) | 65 | 63 | 65 | 62 | 66 |
| | | | P = A/(A + B) | 0.96 | 0.97 | 0.94 | 0.96 | 0.96 |
| Core Properties | | Intermediate layer thickness (mm) | | 1.0 | 1.0 | 1.0 | 1.0 | 1.0 |
| | | Core center hardness (Shore D) | | 40 | 40 | 40 | 40 | 40 |
| | | Core surface hardness (Shore D) | | 52 | 52 | 51 | 53 | 54 |
| | | Compression deformation amount (mm) | | 3.23 | 3.23 | 3.24 | 3.23 | 3.22 |
| Golf ball Properties | | Cover thickness (mm) | | 1.0 | 1.0 | 1.0 | 1.0 | 1.0 |
| | | Compression deformation amount (mm) | | 3.02 | 3.02 | 3.03 | 3.03 | 3.02 |
| | | Durability | | 97 | 96 | 100 | 98 | 97 |
| | | Repulsion Coefficient (Index) | | 100.3 | 100.4 | 100.6 | 100.7 | 100.8 |

Formulation: parts by mass

TABLE 4

| | | | | Golf ball No. | | | | |
|---|---|---|---|---|---|---|---|---|
| | | | | 6 | 7 | 8 | 9 | 10 |
| Intermediate layer composition | | Center No. | | A | A | A | A | A |
| | Resin component | (A)Component | Surlyn 6320 (Mg) | — | 100 | — | — | 100 |
| | | | Himilan AM7327 (Zn) | 100 | — | 100 | 100 | — |
| | | | Surlyn 8320 (Na) | — | — | — | — | — |
| | | | Himilan AM7311 (Mg, binary copolymer) | — | — | — | — | — |
| | | (B)component | Mg stearate | — | 60 | 42 | — | — |

TABLE 4-continued

|  |  | Golf ball No. | | | | |
|---|---|---|---|---|---|---|
|  |  | 6 | 7 | 8 | 9 | 10 |
|  | Ca stearate | — | — | — | — | 33 |
|  | Mg Behenate | 90 | 20 | 42 | — | — |
|  | Mg Montanate | — | — | — | 39 | — |
|  | Titanium oxide | 4 | 4 | 4 | 4 | 4 |
| Properties | Melt flow rate (g/10 min) | 20.0 | 16.2 | 20.6 | 4.5 | 5.1 |
|  | Slab hardness (Shore D) | 56 | 53 | 54 | 54 | 49 |
|  | Bending stiffness (MPa) | 200 | 174 | 168 | 172 | 97 |
|  | Rebound resilience (%) | 64 | 61 | 65 | 57 | 59 |
|  | P = A/(A + B) | 0.97 | 0.96 | 0.97 | 0.93 | 0.94 |
| Core Properties | Intermediate layer thickness (mm) | 1.0 | 1.0 | 1.0 | 1.0 | 1.0 |
|  | Core center hardness (Shore D) | 40 | 40 | 40 | 40 | 40 |
|  | Core surface hardness (Shore D) | 57 | 53 | 54 | 55 | 50 |
|  | Compression deformation amount (mm) | 3.20 | 3.23 | 3.22 | 3.22 | 3.24 |
| Golf ball Properties | Cover thickness (mm) | 1.0 | 1.0 | 1.0 | 1.0 | 1.0 |
|  | Compression deformation amount (mm) | 3.01 | 3.03 | 3.02 | 3.02 | 3.03 |
|  | Durability | 95 | 95 | 94 | 100 | 100 |
|  | Repulsion Coefficient (Index) | 100.9 | 100.4 | 100.5 | 100.6 | 100.5 |

Formulation: parts by mass

TABLE 5

|  |  |  |  | Golf ball No. | | | | |
|---|---|---|---|---|---|---|---|---|
|  |  |  |  | 11 | 12 | 13 | 14 | 15 |
| Intermediate layer composition | Resin Component | (A)Component | Center No. | B | C | B | A | A |
|  |  |  | Surlyn 6320 (Mg) | — | — | — | 100 | 100 |
|  |  |  | Himilan AM7327 (Zn) | 100 | 100 | — | — | — |
|  |  |  | Surlyn 8320 (Na) | — | — | 100 | — | — |
|  |  |  | Himilan AM7311 (Mg, binary copolymer) | — | — | — | — | — |
|  |  | (B)component | Mg stearate | — | — | — | 17.7 | 20 |
|  |  |  | Ca stearate | — | — | — | — | — |
|  |  |  | Mg Behenate | 70 | 70 | 26 | — | — |
|  |  |  | Mg Montanate | — | — | — | — | — |
|  |  |  | Titanium oxide | 4 | 4 | 4 | 4 | 4 |
|  | Properties |  | Melt flow rate (g/10 min) | 18.0 | 18.0 | 3.9 | 2.7 | 3.2 |
|  |  |  | Slab hardness (Shore D) | 54 | 54 | 42 | 45 | 46 |
|  |  |  | Bending stiffness (MPa) | 171 | 171 | 46 | 47 | 71 |
|  |  |  | Rebound resilience (%) | 66 | 66 | 62 | 63 | 61 |
|  |  |  | P = A/(A + B) | 0.96 | 0.96 | 0.92 | 0.90 | 0.91 |
| Core Properties |  | Intermediate layer thickness (mm) |  | 0.7 | 1.8 | 0.7 | 1.0 | 1.0 |
|  |  | Core center hardness (Shore D) |  | 40 | 40 | 40 | 40 | 40 |
|  |  | Core surface hardness (Shore D) |  | 54 | 54 | 43 | 48 | 49 |
|  |  | Compression deformation amount (mm) |  | 3.19 | 3.30 | 3.27 | 3.26 | 3.25 |
| Golf ball Properties |  | Cover thickness (mm) |  | 1.0 | 1.0 | 1.0 | 1.0 | 1.0 |
|  |  | Compression deformation amount (mm) |  | 3.00 | 3.10 | 3.05 | 3.04 | 3.04 |
|  |  | Durability |  | 96 | 100 | 100 | 100 | 100 |
|  |  | Repulsion Coefficient (Index) |  | 100.9 | 100.5 | 100.2 | 100.0 | 100.1 |

Formulation: parts by mass

TABLE 6

|  |  |  |  | Golf ball No. | | | | |
|---|---|---|---|---|---|---|---|---|
|  |  |  |  | 16 | 17 | 18 | 19 | 20 |
| Intermediate layer composition | Resin component | (A)Component | Center No. | A | A | A | A | A |
|  |  |  | Surlyn 6320 (Mg) | 100 | — | — | — | — |
|  |  |  | Himilan AM7327 (Zn) | — | — | 100 | — | — |
|  |  |  | Surlyn 8320 (Na) | — | — | — | — | 100 |
|  |  |  | Himilan AM7311 (Mg, binary copolymer) | — | 100 | — | 100 | — |
|  |  | (B)component | Mg stearate | — | — | 110 | — | 17.7 |
|  |  |  | Ca stearate | 17.7 | 17.7 | — | — | — |
|  |  |  | Mg Behenate | — | — | — | 33 | — |
|  |  |  | Mg Montanate | — | — | — | — | — |
|  |  |  | Titanium oxide | 4 | 4 | 4 | 4 | 4 |

TABLE 6-continued

| | | Golf ball No. | | | | |
|---|---|---|---|---|---|---|
| | | 16 | 17 | 18 | 19 | 20 |
| Properties | Melt flow rate (g/10 min) | 2.4 | 2.3 | 35.7 | 2.8 | 3.2 |
| | Slab hardness (Shore D) | 45 | 62 | 57 | 62 | 39 |
| | Bending stiffness (MPa) | 64 | 234 | 247 | 243 | 40 |
| | Rebound resilience (%) | 58 | 54 | 56 | 55 | 60 |
| | P = A/(A + B) | 0.89 | 0.88 | 0.98 | 0.92 | 0.89 |
| Core Properties | Intermediate layer thickness (mm) | 1.0 | 1.0 | 1.0 | 1.0 | 1.0 |
| | Core center hardness (Shore D) | 40 | 40 | 40 | 40 | 40 |
| | Core surface hardness (Shore D) | 48 | 62 | 58 | 62 | 40 |
| | Compression deformation amount (mm) | 3.26 | 3.18 | 3.20 | 3.18 | 3.20 |
| Golf ball Properties | Cover thickness (mm) | 1.0 | 1.0 | 1.0 | 1.0 | 1.0 |
| | Compression deformation amount (mm) | 3.04 | 2.98 | 3.00 | 2.98 | 3.08 |
| | Durability | 100 | 100 | 65 | 98 | 100 |
| | Repulsion Coefficient (Index) | 100.0 | 99.9 | 99.9 | 100.0 | 99.8 |

Formulation: parts by mass

TABLE 7

| | | | Golf ball No. | 21 |
|---|---|---|---|---|
| Intermediate layer composition | Center No. | | | D |
| | Resin component | (A)Component | Surlyn 6320 (Mg) | — |
| | | | Himilan AM7327 (Zn) | 100 |
| | | | Surlyn 8320 (Na) | — |
| | | | Himilan AM7311 (Mg, binary copolymer) | — |
| | | (B)component | Mg stearate | — |
| | | | Ca stearate | — |
| | | | Mg Behenate | 33 |
| | | | Mg Montanate | — |
| | Titanium oxide | | | 4 |
| | Properties | Melt flow rate (g/10 min) | | 7.1 |
| | | Slab hardness (Shore D) | | 51 |
| | | Bending stiffness (MPa) | | 117 |
| | | Rebound resilience (%) | | 65 |
| | | P = A/(A + B) | | 0.94 |
| Core Properties | Intermediate layer thickness (mm) | | | 2.5 |
| | Core center hardness (Shore D) | | | 40 |
| | Core surface hardness (Shore D) | | | 51 |
| | Compression deformation amount (mm) | | | 3.26 |
| Golf ball Properties | Cover thickness (mm) | | | 1.0 |
| | Compression deformation amount (mm) | | | 3.04 |
| | Durability | | | 103 |
| | Repulsion Coefficient (Index) | | | 99.7 |

Formulation: parts by mass
Surlyn 6320: Magnesium ion neutralized ethylene-methacrylic acid-butyl acrylate ternary copolymer ionomer resin (Melt flow rate(190° C.*2.16 kg): 1.0 g/10 min, P0 = 0.77)available from E. I. du Pont de Nemours and Company
Himilan AM7327: Zinc ion neutralized ethylene-methacrylic acid-butyl acrylate copolymer ionomer resin (Melt flow rate(190° C.*2.16 kg): 0.7 g/10 min, P0 = 0.76) available from Du Pont-Mitsui Polychemicals Co., Ltd
Surlyn 8320: Sodium ion neutralized ethylene-methacrylic acid-butyl acrylate copolymer ionomer resin (Melt flow rate(190° C.*2.16 kg): 1.0 g/10 min, P0 = 0.78) available from E. I. du Pont de Nemours and Company
Himilan AM7311: Magnesium ion neutralized ethylene-methacrylic acid binary copolymer ionomer resin (Melt flow rate(190° C.*2.16 kg): 2.8 g/10 min, P0 = 0.81) available from Du Pont-Mitsui Polychemicals Co., Ltd
Magnesium stearate: NITTO KASEI KOGYO K.K.
Calcium stearate: NITTO KASEI KOGYO K.K.
Magnesium Behenate: NITTO KASEI KOGYO K.K.
Magnesium Montanate: NITTO KASEI KOGYO K.K.

The golf ball resin compositions No. 1 to No. 13 contain 100 parts by mass of (A) an ionomer resin consisting of a metal ion-neutralized product of a ternary copolymer composed of ethylene, α,β-unsaturated carboxylic acid having 3 to 8 carbon atoms and α,β-unsaturated carboxylic acid ester and 25 parts to 100 parts by mass of (B) a metal salt of a fatty acid having 18 to 30 carbon atoms. The fluidity and resilience thereof were excellent. The golf balls No. 1 to No. 13 had an improved resilience, and the durability was at the practical level without substantially being lowered.

The present invention relates to the golf ball resin composition and golf ball, especially, to the intermediate layer composition and the golf ball having the intermediate layer. This application is based on Japanese Patent applications No. 2009-239149 filed on Oct. 16, 2009, and No. 2010-102535 filed on Apr. 27, 2010, the contents of which are hereby incorporated by reference.

The invention claimed is:

1. A three-piece golf ball comprising
a core having a center and one intermediate layer disposed around the center, and
a cover disposed around the core, wherein the intermediate layer is formed from a golf ball resin composition consisting of
100 parts by mass of (A) an ionomer resin consisting of a metal ion-neutralized product of a ternary copolymer composed of ethylene, α,β-unsaturated carboxylic acid having 3 to 8 carbon atoms and α,β-unsaturated carboxylic acid ester, and from 33 parts to 100 parts by mass of (B) a metal salt of a fatty acid having 18 to 30 carbon atoms, and optionally a pigment component, a specific gravity adjusting agent, a dispersant, an antioxidant, an ultraviolet absorber, a light stabilizer, a fluorescent material, or a fluorescent brightener, wherein the golf ball resin composition has a melt flow rate (190° C., 2.16 kg) in a range from 14.7 g/10 min to 600 g/10 min and a slab hardness in a range from 51 to 70 in a Shore D hardness, and wherein the core has a center hardness in a range from 35 to 45 in Shore D hardness, a surface hardness in a range from 30 to 68 in Shore D hardness, a diameter of 39.0 mm to 42.2 mm and a compression deformation amount in a range from 2.10 mm to 3.80 mm, when applying a load from 98N as an initial load to 1275N as a final load to the core.

2. The three-piece golf ball according to claim 1, wherein (A) the ionomer resin is neutralized with magnesium, zinc or sodium.

3. The three-piece golf ball according to claim 1, wherein a fatty acid component of (B) the metal salt of the fatty acid is stearic acid, behenic acid, or montanic acid.

4. The three-piece golf ball according to claim 1, wherein a metal component of (B) the metal salt of the fatty acid is magnesium, calcium, or barium.

5. The three-piece golf ball according to claim 1, wherein the golf ball resin composition has a bending stiffness in a range from 100 MPa to 450 MPa and a rebound resilience in a range from 40% to 80%.

6. The three-piece golf ball according to claim 1, wherein an area A under a peak around 1600 cm$^{-1}$ and an area B under a peak around 1700 cm$^{-1}$ in a spectrum obtained by analyzing the golf ball resin composition by FT-IR satisfy the equation:

$$0.50 \leq P=A/(A+B) \leq 1.00$$

wherein P is the ratio of neutralized carboxyl groups to all carboxyl groups.

7. The three-piece golf ball according to claim 1, wherein an area A0 under a peak around 1600 cm$^{-1}$ corresponding to neutralized carboxyl groups and an area B0 under a peak around 1700 cm$^{-1}$ corresponding to non-neutralized carboxy groups in a spectrum obtained by analyzing (A) the ionomer resin by FT-IR satisfy the equation:

$$0.30 \leq P0=A0/(A0+B0) \leq 0.98$$

wherein P0 is the ratio of neutralized carboxyl groups to all carboxyl groups.

8. The three-piece golf ball according to claim 1, wherein the intermediate layer has a thickness of 0.5 mm or more, and less than 2.5 mm.

9. The three-piece golf ball according to claim 1, wherein the cover comprises an ionomer resin as a resin component.

10. A three-piece golf ball comprising a core having a center and one intermediate layer disposed around the center, and a cover disposed around the core, wherein the intermediate layer is formed from a golf ball resin composition consisting of a resin component and optionally a pigment component, a specific gravity adjusting agent, a dispersant, an antioxidant, an ultraviolet absorber, a light stabilizer, a fluorescent material, or a fluorescent brightener, wherein the resin component consists of 100 parts by mass of (A) an ionomer resin consisting of a metal ion-neutralized product of a ternary copolymer composed of ethylene, α,β-unsaturated carboxylic acid having 3 to 8 carbon atoms and α,β-unsaturated carboxylic acid ester, from 33 parts to 100 parts by mass of (B) a metal salt of a fatty acid having 18 to 30 carbon atoms, and another thermoplastic elastomer such that a total content of (A) the ionomer resin and (B) the metal salt of a fatty acid in the resin component is 50 mass % or more, wherein the golf ball resin composition has a melt flow rate (190° C., 2.16 kg) in a range from 14.7 g/10 min to 600 g/10 min and a slab hardness in a range from 51 to 70 in a Shore D hardness, wherein the core has a center hardness in a range from 35 to 45 in Shore D hardness, a surface hardness in a range from 30 to 68 in Shore D hardness, a diameter of 39.0 mm to 42.2 mm and a compression deformation amount in a range from 2.10 mm to 3.80 mm, when applying a load from 98 N as an initial load to 1275 N as a final load to the core, and wherein the cover comprises an ionomer resin as a resin component.

11. The three-piece golf ball according to claim 10, wherein (A) the ionomer resin is neutralized with magnesium, zinc or sodium.

12. The three-piece golf ball according to claim 10, wherein a fatty acid component of (B) the metal salt of the fatty acid is stearic acid, behenic acid, or montanic acid.

13. The three-piece golf ball according to claim 10, wherein a metal component of (B) the metal salt of the fatty acid is magnesium, calcium, or barium.

14. The three-piece golf ball according to claim 10, wherein the golf ball resin composition has a bending stiffness in a range from 100 MPa to 450 MPa and a rebound resilience in a range from 40% to 80%.

15. The three-piece golf ball according to claim 10, wherein an area A under a peak around 1600 cm$^{-1}$ and an area B under a peak around 1700 cm$^{-1}$ in a spectrum obtained by analyzing the golf ball resin composition by FT-IR satisfy the equation:

$$0.50 < P=A/(A+B) \leq 1.00$$

wherein P is the ratio of neutralized carboxyl groups to all carboxyl groups.

16. The three-piece golf ball according to claim 10, wherein an area A0 under a peak around 1600 cm$^{-1}$ corresponding to neutralized carboxyl groups and an area B0 under a peak around 1700 cm$^{-1}$ corresponding to non-neutralized carboxy groups in a spectrum obtained by analyzing (A) the ionomer resin by FT-IR satisfy the equation:

$$0.30 \leq P0=A0/(A0+B0) \leq 0.98$$

wherein P0 is the ratio of neutralized carboxyl groups to all carboxyl groups.

17. The three-piece golf ball according to claim 10, wherein the intermediate layer has a thickness of 0.5 mm or more, and less than 2.5 mm.

* * * * *